Oct. 17, 1950

F. KNOWLTON
SEED GATHERING AND STRIPPING
ATTACHMENT FOR HARVESTERS 2,526,141

Filed May 13, 1947

Inventor
Fred Knowlton

By *Clarence A. O'Brien and Harvey B. Jacobson*
Attorneys

Oct. 17, 1950
F. KNOWLTON
SEED GATHERING AND STRIPPING
ATTACHMENT FOR HARVESTERS
2,526,141
Filed May 13, 1947
2 Sheets-Sheet 2
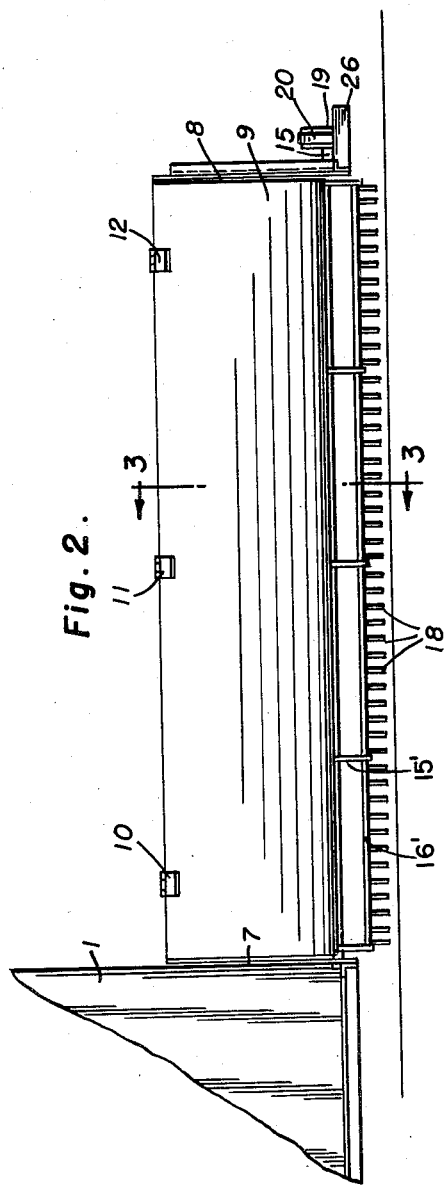
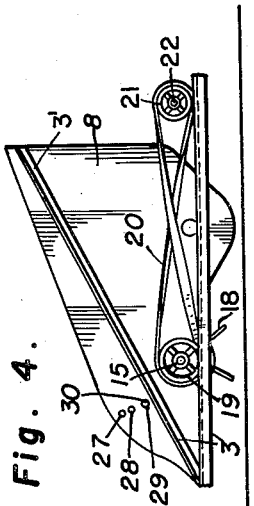
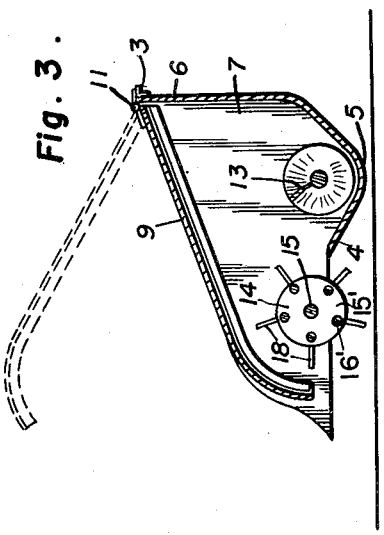
Inventor
Fred Knowlton
By *Clarence A. O'Brien
and Harvey B. Jacobson*
Attorneys Patented Oct. 17, 1950

2,526,141

UNITED STATES PATENT OFFICE 2,526,141

SEED GATHERING AND STRIPPING ATTACHMENT FOR HARVESTERS

Fred Knowlton, Oxford, Kans.

Application May 13, 1947, Serial No. 747,664

3 Claims. (Cl. 56—128)

This invention relates to an improved cylinder attachment for a combine harvester.

An object of the invention is to provide an improved cylinder attachment for a combine harvester including a platform formed with a transversely extending trough in which a grain auger is mounted for rotation, and a rotatably mounted toothed cylinder disposed a slight distance forwardly of said auger and platform, with means connected with the threshing cylinder shaft for rotating said auger and said cylinder.

Another object of the invention is to provide an improved cylinder attachment for a combine harvester which will be adjustably supported thereon and driven by a power shaft connected to the threshing cylinder shaft.

A further object of the invention is to provide an improved cylinder attachment for replacing the usual sickle bar and reel on a combine harvester, together with means for selectively varying the height of the same with respect to the ground, and means for driving said cylinder.

Another object of the invention is to provide an improved cylinder attachment for a combine harvester adapted to be driven thereby, together with grain dividers at the opposite end thereof, and a hinged cover or hood for guiding and deflecting the grain from the cylinder onto the platform, either of the auger type or movable canvas type.

A still further object of the invention is to provide an improved cylinder attachment for a combine harvester which will be highly efficient in operation, and relatively inexpensive to manufacture and produce.

Other objects will appear as the description proceeds.

In the accompanying drawings which form a part of this application,

Figure 2 is a front elevation of the improved cylinder attachment shown upon a combine harvester;

Figure 3 is a sectional view taken on the line 3—3 of Figure 2, and;

Figure 4 is an end view of the improved cylinder attachment.

Like characters of reference are used throughout the following specification and the accompanying drawings to designate corresponding parts.

Figure 1:
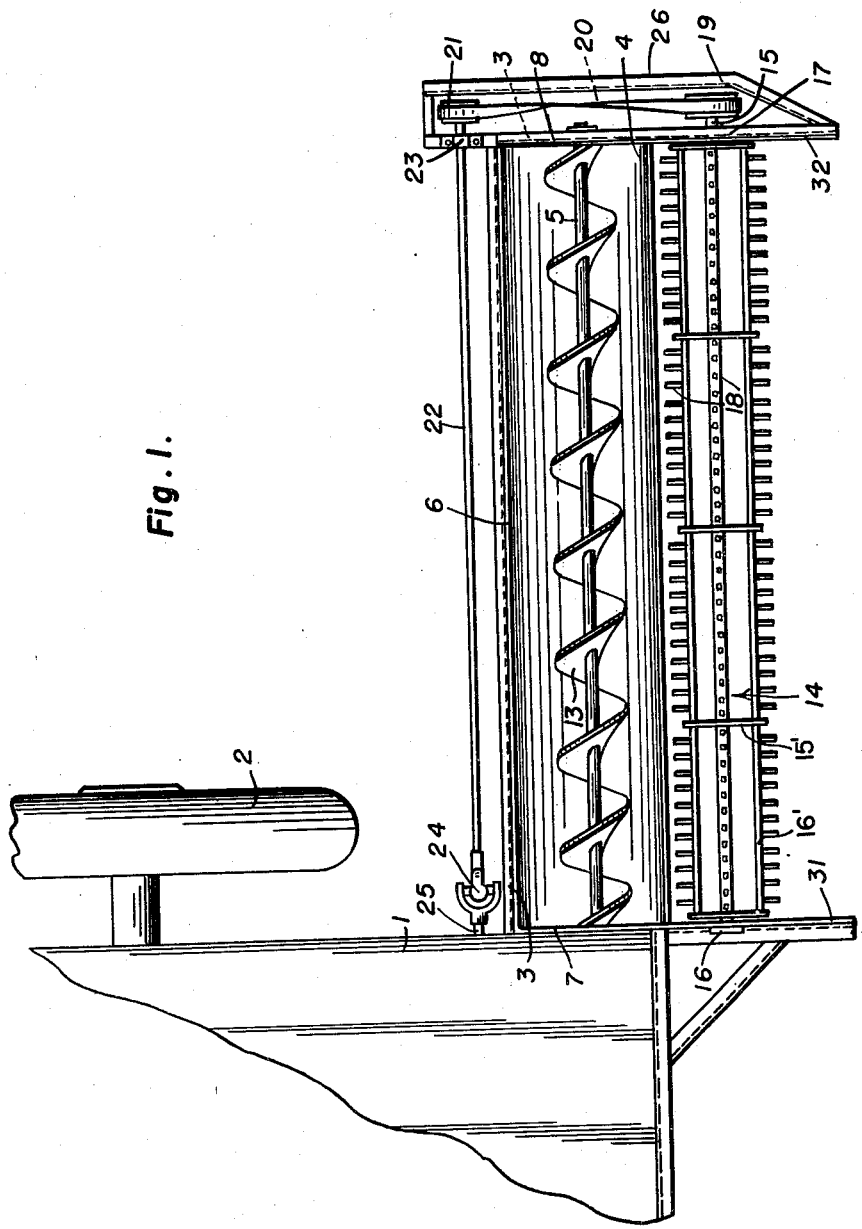
Figure 1 is a plan view of the improved cylinder attachment shown with the hood removed and attached to a combine harvester.

In carrying out the invention, there is provided a usual type of combine harvester generally designated by the reference numeral 1, and being supported by a plurality of wheels similar to the wheel 2.

A substantially rectangular frame is provided, being V-shaped in end elevation and formed of angle iron strips or members 3 and 3'.

The cylinder attachment includes a housing formed of a transversely extending trough-shaped bottom wall 5 having a forward edge 4, and an upstanding back portion 6, preferably formed integrally with the bottom wall.

Suitable ends 7 and 8 for the housing made of sheet iron or any other desired material are secured to the angle strips 3 and 3', and to the opposite ends of the bottom and back walls. A forwardly and downwardly extending hood 9 will be hinged at its rear end by means of the three hinges 10, 11 and 12 to the upper edge of the back 6 of the platform 4.

An auger 13 will be mounted for rotation between the ends 7 and 8 of the cylinder attachment within said trough 5 for conveying the grain from the attachment to the combine harvester 1 and may be driven from any operative part of said harvester.

The improved cylinder generally designated by the reference numeral 14 will be disposed transversely of the ends 7 and 8, and forwardly of the forward edge 4 of the bottom wall 5. The cylinder includes a central axle 15 which is rotatably received in bearings 16 and 17 supported in the opposite ends 7 and 8. A plurality of disks 15' are secured to the shaft 15 at longitudinally spaced points, and a plurality of circumferentially spaced rods are secured to the disks. A transversely extending row of short teeth 18 is secured to each of said rods and extend radially from said cylinder.

A pulley 19 is mounted upon the outer end of the shaft or axle 15, and will support one end of a belt 20 whose rear end will extend over a pulley 21 secured to the outer end of the power shaft 22 supported in the bearing 23 on the frame strip or member 3. The opposite end of the power shaft 22 is coupled by means of the universal joint 24 with the adjacent end of the usual threshing cylinder shaft 25.

A guard 26 will be disposed about the belt 20 and the pulleys 19 and 21 to protect the same.

The hood 9 will have its forward edge rounded and will extend downwardly and terminate approximately opposite the central axle 15 of the cylinder 14 to overlie the cylinder.

A series of openings 27, 28 and 29 will be formed in the ends 8 and 9 of the device for adjustably supporting the hood 9 at various heights above the ground, being secured in the desired adjustment by means of a bolt 28.

In operation, the forwardly extending grain dividers 30 and 31 will divide the grain into swathes which will be cut, and as the cylinder 14 rotates in a rearwardly direction, the fallen grain or grains which has been knocked down by rain or wind, will be picked up by the teeth 18 and guided under the bowed edge of the hood 9 to be operated upon by the rapidly rotating cylinder 14.

From the foregoing description, it will be apparent that there has been devised and provided a highly efficient form of cylinder attachment for a combine harvester, which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. In a feeding attachment for a harvester, a housing including a back wall, a pair of parallel side walls secured to said back wall and extending forwardly therefrom, a trough shaped bottom wall secured to the lower edge of said side walls adjacent the rear portion thereof, a conveyor mounted in said housing for movement parallel to said bottom wall, a hood attached to said rear wall and extending forwardly and downwardly between said side walls, a curved end portion on said hood having a lower edge extending transversely of said side walls, a cylinder rotatably mounted between said side walls and positioned in advance of said bottom wall, the lowermost portion of said bottom wall and the lower edge of said hood defining a plane, a portion of said cylinder extending below said plane, a plurality of radially extending fingers on said cylinder.

2. In a feeding attachment for a harvester, a housing including a back wall, a pair of parallel side walls secured to said back wall and extending forwardly therefrom, a trough shaped bottom wall secured to the lower edge of said side walls adjacent the rear portion thereof, each of said side walls having a lower edge extending forwardly of said bottom wall, attachment support arms secured to the sides of said side walls, the undersurface of said trough shaped bottom wall being the lowermost portion of said attachment when said lower edges of said side walls extend horizontally, a conveyor mounted in said housing adjacent said bottom wall, a cylinder rotatably mounted between said side walls and positioned in advance of said bottom wall, a hood attached to said back wall and to said side walls and extending forwardly and downwardly over said conveyor and said cylinder, a curved end portion on said hood having a lower edge, a plane defined by the lowermost portion of said bottom wall and the lower edge of said hood, a portion of said cylinder extending below said plane, a plurality of radially extending raking and stripping fingers on said cylinder.

3. In a feeding attachment for a harvester, a housing having a vertically extending back wall, a pair of parallel side walls secured to said back wall and extending forwardly therefrom, a trough shaped bottom wall secured to the lower edge of said side wall adjacent the rear portion thereof, each of said side walls having a lower edge extending forwardly of said bottom wall, attachment support arms secured to the sides of said side walls, the undersurface of said trough shaped bottom wall being the lowermost portion of said attachment when said lower edges of said side walls extend horizontally, a conveyor mounted in said housing adjacent said bottom wall, a cylinder rotatably mounted between said side walls and positioned in advance of said bottom wall, a hood vertically pivotally attached to said back wall and extending forwardly and downwardly over said conveyor and said cylinder, said hood being slidably received between said side walls for movement towards and away from said cylinder, a downwardly curved lower end portion on said hood having a lower edge extending transversely of said side walls, means for locking said hood in a predetermined angularly adjusted position, a plane defined by the lowermost portion of said bottom wall and said lower edge of said hood when said hood is in its lowermost position, a portion of said cylinder extending below said plane, and a plurality of radially extending fingers extending outwardly from said cylinder.

FRED KNOWLTON.

REFERENCES CITED

The following references are of record in the file of this patent:

UNITED STATES PATENTS

| Number | Name | Date |
|---|---|---|
| 1,370,919 | Schaefer | Mar. 8, 1921 |
| 1,915,401 | Braasch | June 27, 1933 |
| 2,047,274 | Korsmo | July 14, 1936 |
| 2,178,023 | Pierson | Oct. 31, 1939 |
| 2,301,873 | Heth et al. | Nov. 10, 1942 |

FOREIGN PATENTS

| Number | Country | Date |
|---|---|---|
| 8,698 | Australia | Aug. 11, 1932 |